US012170042B2

(12) United States Patent
Zhang et al.

(10) Patent No.: US 12,170,042 B2
(45) Date of Patent: Dec. 17, 2024

(54) DETECTION CIRCUIT FOR DETECTING LUMINANCE OF AMBIENT LIGHT, DISPLAY PANEL, AND DETECTION METHOD

(71) Applicants: Beijing BOE Display Technology Co., Ltd., Beijing (CN); BOE Technology Group Co., Ltd., Beijing (CN)

(72) Inventors: Lianghao Zhang, Beijing (CN); Xinle Wang, Beijing (CN); Yifan Song, Beijing (CN); Wenchao Han, Beijing (CN); Zhaohui Meng, Beijing (CN); Wanzhi Chen, Beijing (CN); Jing Liu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/778,489

(22) PCT Filed: May 18, 2021

(86) PCT No.: PCT/CN2021/094266
§ 371 (c)(1),
(2) Date: May 20, 2022

(87) PCT Pub. No.: WO2022/241631
PCT Pub. Date: Nov. 24, 2022

(65) Prior Publication Data
US 2024/0153423 A1 May 9, 2024

(51) Int. Cl.
G09G 3/20 (2006.01)
(52) U.S. Cl.
CPC ....... *G09G 3/20* (2013.01); *G09G 2310/0286* (2013.01); *G09G 2310/0297* (2013.01);
(Continued)

(58) Field of Classification Search
None
See application file for complete search history.

(56) References Cited

U.S. PATENT DOCUMENTS 6,177,915 B1 1/2001 Beeteson et al.
8,760,475 B2 6/2014 Hsieh
(Continued)

FOREIGN PATENT DOCUMENTS

CN 101312034 A 11/2008
CN 101629847 A 1/2010
(Continued)

OTHER PUBLICATIONS

Espacenet translation of CN105185310A, Wang Huorong, Display screen brightness adjusting method, Publication Date Dec. 23, 2015.*

(Continued)

*Primary Examiner* — Amr A Awad
*Assistant Examiner* — Donna V Bocar
(74) *Attorney, Agent, or Firm* — WHDA, LLP

(57) ABSTRACT

There is provided a detection circuit, a display panel and a detection method. The detection circuit includes: a conversion circuit configured to acquire a photoelectric sensing signal in real time and convert the acquired photoelectric sensing signal into a luminance value; a storage circuit configured to store N luminance values from the conversion circuit on a first input first output basis; a discrimination circuit connected to the storage circuit and configured to determine whether at least two of the N luminance values meet a preset condition; and an output circuit connected to the discrimination circuit and the storage circuit, and configured to output a preset default luminance value in response to the at least two luminance values meeting the preset condition and output at least one of the N luminance (Continued)

values in response to the at least two luminance values not meeting the preset condition.

18 Claims, 9 Drawing Sheets

(52) U.S. Cl.
CPC .............. *G09G 2320/0626* (2013.01); *G09G 2360/144* (2013.01); *G09G 2360/16* (2013.01)

(56) References Cited

U.S. PATENT DOCUMENTS

| | | | |
|---|---|---|---|
| 2008/0291139 A1 | 11/2008 | Hsieh | |
| 2011/0181786 A1* | 7/2011 | Yamazaki | G09G 3/2077 |
| | | | 348/E5.062 |
| 2016/0253014 A1* | 9/2016 | Yang | G09G 3/32 |
| | | | 345/174 |
| 2017/0039994 A1 | 2/2017 | Wu | |
| 2020/0175902 A1* | 6/2020 | Huang | G09G 3/3225 |

FOREIGN PATENT DOCUMENTS

| | | |
|---|---|---|
| CN | 105185310 A | 12/2015 |
| CN | 106169290 A | 11/2016 |
| CN | 112492102 A | 3/2021 |

OTHER PUBLICATIONS

Espacenet translation of CN112492102A, Zhang Xuguang, Terminal screen brightness control method and terminal, Publication Date Mar. 12, 2021.*

* cited by examiner

| ΔL | Target value |
|---|---|
| >90 | 0 |
| 80-89 | 10 |
| 75-79 | 15 |
| 70-74 | 20 |
| 65-69 | 30 |
| 60-64 | 35 |
| 55-59 | 40 |
| 50-54 | 45 |
| 45-49 | 50 |
| 40-44 | 55 |
| 35-39 | 60 |
| 30-34 | 65 |
| 25-29 | 70 |
| 20-24 | 75 |
| 15-19 | 80 |
| 10-14 | 83 |
| <10 | Return original value |

FIG. 5

DETECTION CIRCUIT FOR DETECTING LUMINANCE OF AMBIENT LIGHT, DISPLAY PANEL, AND DETECTION METHOD

CROSS-REFERENCE TO RELATED APPLICATION(S)

The present disclosure is a Section 371 National Stage Application of International Application No. PCT/CN2021/094266, filed on May 18, 2021, entitled "DETECTION CIRCUIT, DISPLAY PANEL, AND DETECTION METHOD", which is incorporated herein by reference in their entirety.

TECHNICAL FIELD

The present disclosure relates to a field of a display technology, in particular to a detection circuit, a display panel and a detection method.

BACKGROUND

In a related art, a photosensitive sensor is used to detect an ambient light and generate an electrical signal according to a change of the ambient light, and a processor may control a luminance value of a screen according to a value of the electrical signal. However, when the photosensitive sensor in the related art converts an optical signal into an electrical signal, the time required for the photosensitive sensor to achieve the conversion is different due to different ambient luminance, and thus an actual luminance change may not be fed back accurately and quickly if the conversion time is long.

SUMMARY

In an aspect, there is provided a detection circuit, including: a conversion circuit configured to acquire a photoelectric sensing signal in real time and convert the acquired photoelectric sensing signal into a luminance value; a storage circuit connected to the conversion circuit and configured to store N luminance values from the conversion circuit on a first input first output basis; a discrimination circuit connected to the storage circuit and configured to determine whether at least two luminance values of the N luminance values meet a preset condition; and an output circuit connected to the discrimination circuit and the storage circuit, and configured to output a preset default luminance value in response to the at least two luminance values meeting the preset condition and output at least one of the N luminance values in response to the at least two luminance values not meeting the preset condition.

According to some exemplary embodiments, the discrimination circuit includes: a first discrimination sub-circuit connected to the storage circuit and configured to determine whether at least one luminance value of the N luminance values is less than a preset reference luminance value; and a second discrimination sub-circuit connected to the storage circuit and configured to determine whether a difference between the at least two luminance values of the N luminance values exceeds a preset reference luminance difference.

According to some exemplary embodiments, the first discrimination sub-circuit includes: a first register configured to store the preset reference luminance value; a first subtractor connected to the storage circuit and the first register, and configured to subtract a first luminance value in the N luminance values from the preset reference luminance value stored in the first register, so as to obtain a first difference value; and a first comparator connected to the first subtractor and configured to determine whether the first difference value output by the first subtractor is greater than 0.

According to some exemplary embodiments, the second discrimination sub-circuit includes: a second register configured to store the reference luminance difference; a second subtractor connected to the storage circuit and configured to subtract an $(N-i)^{th}$ luminance value in the N luminance values from an $N^{th}$ luminance value in the N luminance values, so as to obtain a second difference value, where i is an integer, $1 \leq i < N$; and a second comparator connected to the second register and the second subtractor, and configured to determine whether the second difference value output by the second subtractor is less than the reference luminance difference stored in the second register.

According to some exemplary embodiments, the output circuit includes: a first selection sub-circuit connected to the first subtractor and the first comparator, and configured to select, from a plurality of preset default luminance values, a default luminance value matching the first difference value output by the first subtractor and output the selected default luminance value, in response to the first comparator determining that the first difference value is greater than 0; and a first switch sub-circuit connected to the first comparator, the second comparator and the storage circuit, and configured to output the $N^{th}$ luminance value in the N luminance values in response to at least one of: the first comparator determining that the first difference value is not greater than 0; or the second comparator determining that the second difference value is less than the preset reference luminance difference.

According to some exemplary embodiments, the first selection sub-circuit includes: a plurality of shift registers configured to store a plurality of preset default luminance values respectively; a third comparator connected to the first subtractor and the first comparator, and configured to determine, from a plurality of preset voltage ranges, a voltage range containing the first difference value, in response to the first comparator determining that the first difference value is greater than 0; and a multiplexer configured to control one of the plurality of shift registers to output the default luminance value stored by the one of the plurality of shift registers according to the voltage range determined by the third comparator.

According to some exemplary embodiments, in the detection circuit, N=4, i=1.

According to some exemplary embodiments, in the detection circuit, the reference luminance value is in a range of 90 Lux to 110 Lux, and the reference luminance difference is in a range of 2 Lux to 4 Lux.

According to some exemplary embodiments, the reference luminance value includes a first reference luminance value and a second reference luminance value less than the first reference luminance value, and the first discrimination sub-circuit includes: a fourth register configured to store the first reference luminance value; a fourth comparator configured to determine whether a $(1+j)^{th}$ luminance value in the N luminance values is less than the first reference luminance value, where j is an integer, $1 \leq j < N$; a fifth register configured to store the second reference luminance value; and a fifth comparator configured to determine whether an $N^{th}$ luminance value in the N luminance values is less than the second reference luminance value.

According to some exemplary embodiments, the preset reference luminance difference includes a first reference luminance difference and a second reference luminance difference, and the second discrimination sub-circuit includes: a sixth register configured to store the first reference luminance difference; a sixth comparator connected to the fourth comparator, the fifth comparator and the sixth register, and configured to determine whether a difference value obtained by subtracting the $(1+j)^{th}$ luminance value from the first luminance value in the N luminance values is greater than the first reference luminance difference in response to the fourth comparator determining that the $(1+j)^{th}$ luminance value is less than the first reference luminance value, and trigger the fifth comparator to determine whether the $N^{th}$ luminance value in the N luminance values is less than the second reference luminance value in response to determining that the difference value obtained by subtracting the $(1+j)^{th}$ luminance value from the first luminance value is greater than the first reference luminance difference; a timer connected to the fifth comparator and configured to start timing in response to the fifth comparator determining that the $N^{th}$ luminance value in the N luminance values is less than the second reference luminance value; a seventh register configured to store the second reference luminance difference; and a seventh comparator connected to the storage circuit, the seventh register and the fifth comparator, and configured to determine a difference value between the $N^{th}$ luminance value and an $(N-k)^{th}$ luminance value in the N luminance values is less than the second reference luminance difference in response to the fifth comparator determining that the $N^{th}$ luminance value in the N luminance values is less than the second reference luminance difference, where k is an integer, $1 \leq k < N$.

According to some exemplary embodiments, the output circuit includes: a second selection sub-circuit connected to the seventh comparator and the timer, and configured to output a preset default luminance value in a case of the timer is not expired the seventh comparator determines that the difference value between the $N^{th}$ luminance value and the $(N-k)^{th}$ luminance value is less than the second reference luminance difference and in response to; and a second switch sub-circuit connected to the fourth comparator, the fifth comparator, the sixth comparator, the seventh comparator and the storage circuit, and configured to output the Nth luminance value in the N luminance values in response to at least one of: the fourth comparator determining that the $(1+j)^{th}$ luminance value in the N luminance values is not less than the first reference luminance value; the fifth comparator determining that the $N^{th}$ luminance value in the N luminance values is not less than the second reference luminance value; the sixth comparator determining that the difference value obtained by subtracting the $(1+j)^{th}$ luminance value from the first luminance value in the N luminance values is not greater than the first reference luminance difference; the seventh comparator determining that the difference value between the $N^{th}$ luminance value and the $(N-k)^{th}$ luminance value in the N luminance values is not less than the second reference luminance difference; or the timer being expired.

According to some exemplary embodiments, in the detection circuit, N=20, j=2, k=2.

According to some exemplary embodiments, in the detection circuit, the first reference luminance value is in a range of 90 Lux to 110 Lux; and the second reference luminance value is in a range of 20 Lux to 40 Lux;

According to some exemplary embodiments, in the detection circuit, the first reference luminance difference is in a range of 150 Lux to 250 Lux; and the second reference luminance difference is in a range of 1 Lux to 3 Lux.

In another aspect, there is further provided a display panel, including: a photoelectric sensor configured to generate a photoelectric sensing signal by converting an optical signal into an electrical signal; and the detection circuit described above, wherein the detection circuit is connected to the photoelectric sensor.

In another aspect, there is further provided a method for detection, including: acquiring a photoelectric sensing signal in real time and converting the acquired photoelectric sensing signal into a luminance value; storing N luminance values from the conversion circuit on a first input first output basis; determining whether at least two luminance values of the N luminance values meet a preset condition; and outputting a preset default luminance value in response to the at least two luminance values meeting the preset condition, and outputting at least one of the N luminance values in response to the at least two luminance values not meeting the preset condition.

According to some exemplary embodiments, the determining whether at least two luminance values of the N luminance values meet a preset condition includes: determining whether at least one luminance value of the N luminance values is less than a preset reference luminance value; and determining whether a difference value between the at least two luminance values of the N luminance values exceeds a preset reference luminance difference.

BRIEF DESCRIPTION OF THE DRAWINGS

By describing in detail exemplary embodiments of the present disclosure with reference to the drawings, the features and advantages of the present disclosure will become more apparent.

FIG. 5 schematically shows a mapping table of a default luminance value corresponding to a first difference value according to the exemplary embodiments of the present disclosure.

DETAILED DESCRIPTION OF EMBODIMENTS

Figure 1A:
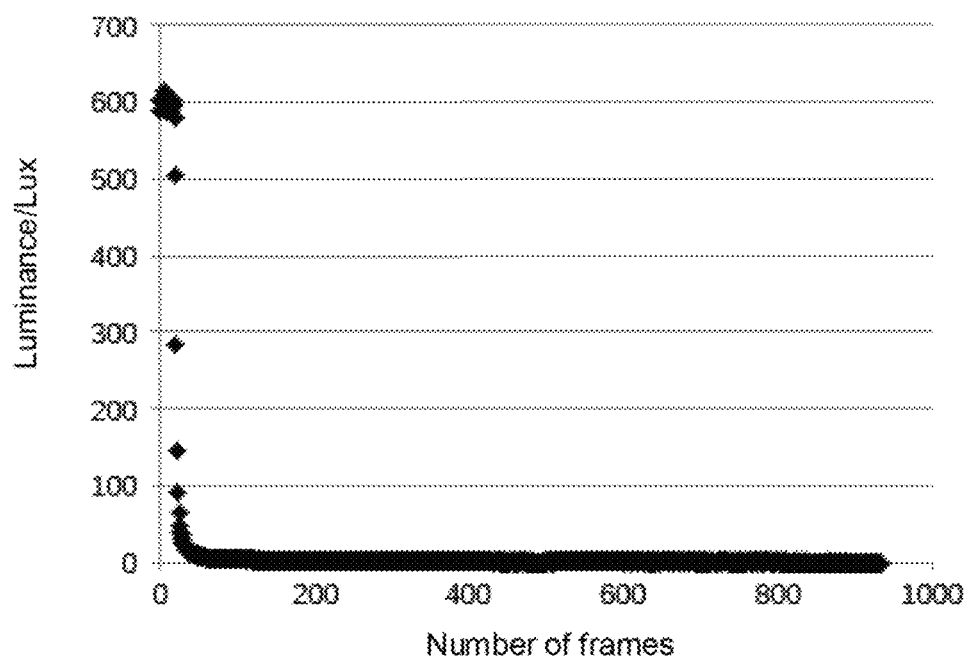
FIG. 1(a) and FIG. 1(b) schematically show a curve of luminance vs number of frames in response to a change of ambient light for a sensor of a detection circuit in a related art.

In order to make the objectives, technical solutions and advantages of the present disclosure more clear, the technical solutions of the embodiments of the present disclosure are clearly and completely described below with reference to the drawings. Obviously, the described embodiments are only a part rather than all of the embodiments of the present disclosure. Based on the embodiments of the present disclosure, all other embodiments obtained by those of ordinary skilled in the art without carrying out inventive effort fall within the scope of protection of the present disclosure.

It should be noted that, in the drawings, for clarity and/or description purposes, size and relative size of elements may be enlarged. Accordingly, the size and relative size of each element need not to be limited to those shown in the drawings. In the specification and drawings, the same or similar reference numerals indicate the same or similar components.

When an element is described as being "on", "connected to" or "coupled to" another element, the element may be directly on the other element, directly connected to the other element, or directly coupled to the other element, or an intermediate element may be provided. However, when an element is described as being "directly on", "directly connected to" or "directly coupled to" another element, no intermediate element is provided. Other terms and/or expressions used to describe the relationship between elements, for example, "between" and "directly between", "adjacent" and "directly adjacent", "on" and "directly on", and so on, should be interpreted in a similar manner. In addition, the term "connection" may refer to a physical connection, an electrical connection, a communication connection, and/or a fluid connection. In addition, X-axis, Y-axis and Z-axis are not limited to three axes of a rectangular coordinate system, and may be interpreted in a broader meaning. For example, the X-axis, the Y-axis and the Z-axis may be perpendicular to each other, or may represent different directions that are not perpendicular to each other. For the objective of the present disclosure, "at least one of X, Y and Z" and "at least one selected from a group consisting of X, Y and Z" may be interpreted as only X, only Y, only Z, or any combination of two or more of X, Y and Z, such as XYZ, XYY, YZ and ZZ. As used herein, the term "and/or" includes any and all combinations of one or more of the listed related items.

It should be noted that although the terms "first". "second", and so on may be used herein to describe various components, members, elements, regions, layers and/or parts, these components, members, elements, regions, layers and/or parts should not be limited by these terms. Rather, these terms are used to distinguish one component, member, element, region, layer and/or part from another. Therefore, for example, a first component, a first member, a first element, a first region, a first layer and/or a first part discussed below may be referred to as a second component, a second member, a second element, a second region, a second layer and/or a second part without departing from the teachings of the present disclosure.

For ease of description, spatial relationship terms, such as "upper", "lower", "left", "right", etc. may be used herein to describe a relationship between one element or feature and another element or feature as shown in the figure. It should be understood that the spatial relationship terms are intended to cover other different orientations of the device in use or operation in addition to the orientation described in the figure. For example, if the device in the figure is turned upside down, an element or feature described as "below" or "under" another element or feature will be oriented "above" or "on" the other element or feature.

Figure 1B:
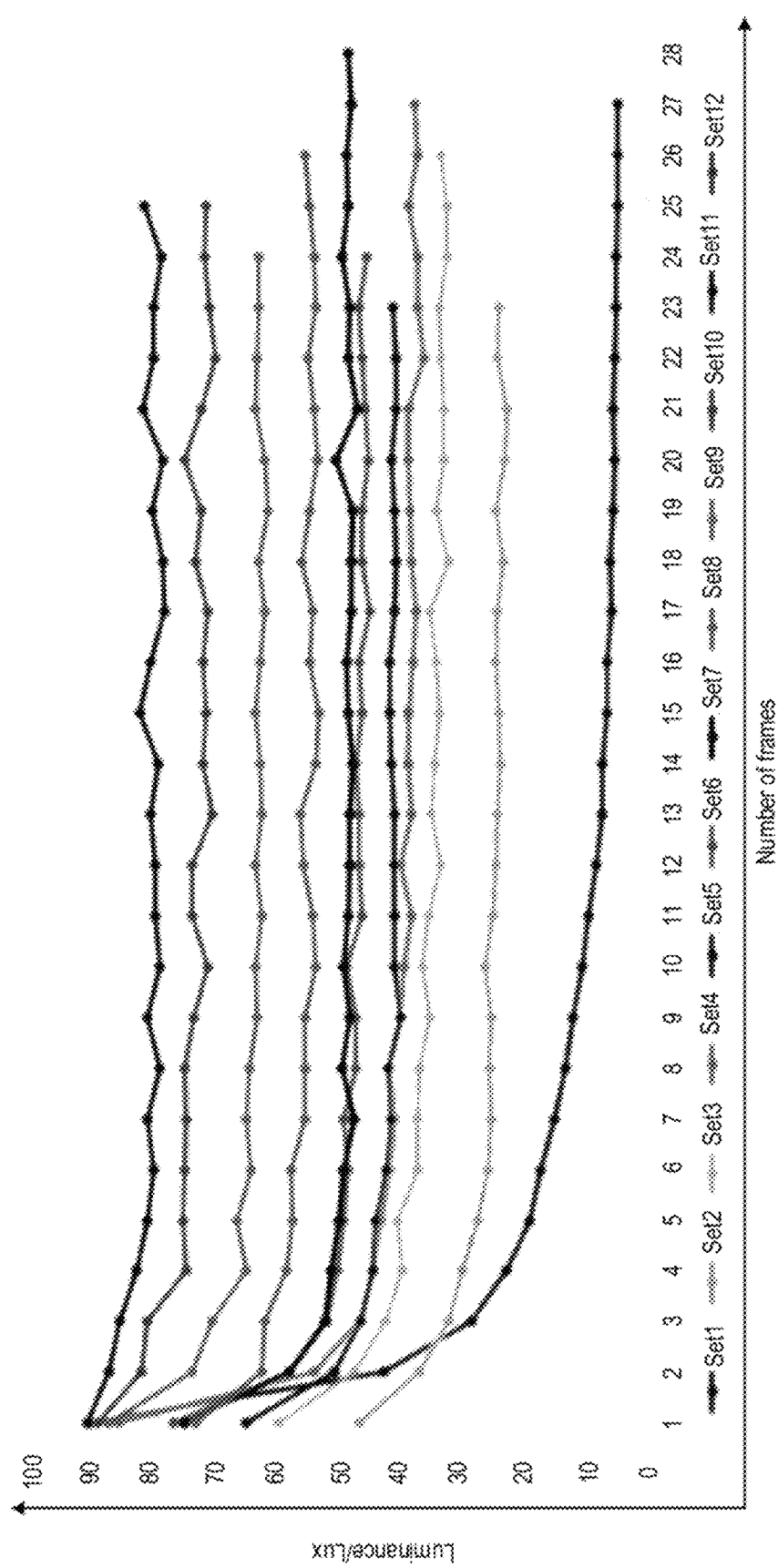

FIG. 1(*a*) and FIG. 1(*b*) schematically show a luminance-frame number curve of a sensor of a detection circuit in a related art in response to a change of ambient light.

FIG. 1(*a*) shows the number of frames required when the ambient luminance decreases from a high luminance to a low luminance. As shown in FIG. 1(*a*), the abscissa represents the number of frames, and the ordinate represents the luminance value. When the ambient luminance decreases from 600 Lux to 100 Lux, a small number of frames, such as 2-3 frames are required, while when the luminance drops to 100 Lux and then continues to decrease from 100 Lux to 0 Lux, a large number of frames, such as 800 frames are required. The greater the number of frames, the longer the time required, which may result in a feedback lag of the photosensitive sensor. FIG. 1(*b*) shows the number of frames required when the ambient luminance decreases from a high luminance to a low target luminance, where the abscissa represents the number of frames, and the ordinate represents the luminance value. FIG. 1(*b*) shows the numbers of frames when the luminance decreases from a high luminance to 0 Lux, 30 Lux, 41 Lux, 49 Lux, 55 Lux, 61 Lux, 68 Lux, 74 Lux, 81 Lux, 87 Lux and 93 Lux. In order to more clearly show the change of luminance in a range of 100 Lux, FIG. 1(*b*) only shows a curve of luminance vs number of frames with the luminance decreasing from 100 Lux to the target luminance. As shown, the lower the target luminance value is, the more frames are required for the luminance to decrease from high to low, that is, the longer time is required.

According to the data in FIG. 1(*a*) and FIG. 1(*b*) and the non-equilibrium carrier recombination formula:

$$\Delta p = \Delta p_0 a^{-t/\tau} \qquad \text{Equation(1)}$$

where $\tau$ represents a non-equilibrium carrier lifetime, $\Delta p$ represents a non-equilibrium carrier concentration, and $\Delta p_0$ represents an equilibrium carrier concentration, by combining the curve in FIG. 1 and Equation (1), it may be explained that when the ambient light suddenly dims, the number of non-equilibrium carriers in the photosensitive sensor first decreases rapidly and then gradually decreases slowly with time. Therefore, when the ambient light luminance decreases from 100 Lux to 0 Lux, a response time of the photosensitive sensor in the TFT is too long, affecting a user experience.

Figure 2:
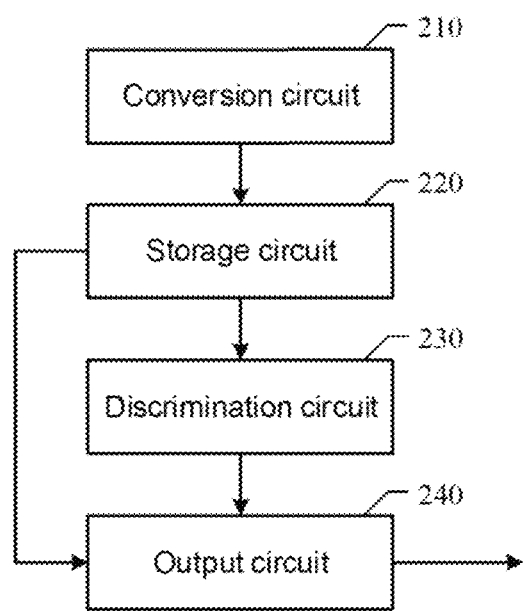
FIG. 2 schematically shows a schematic structural diagram of a detection circuit according to the exemplary embodiments of the present disclosure.

FIG. 2 schematically shows a schematic structural diagram of a detection circuit according to the exemplary embodiments of the present disclosure.

As shown in FIG. 2, a detection circuit 200 of the embodiments of the present disclosure includes a conversion circuit 210, a storage circuit 220, a discrimination circuit 230, and an output circuit 240. The conversion circuit 210 is used to acquire a photoelectric sensing signal in real time and convert the acquired photoelectric sensing signal into a luminance value. For example, the conversion circuit may acquire a photoelectric sensing signal provided by a photoelectric sensor, and convert the photoelectric sensing signal into a luminance value through an analog-to-digital conversion. The storage circuit 220 is connected to the conversion circuit 210 and used to store N luminance values from the conversion circuit 210 on a first input first output basis. The discrimination circuit 230 is connected to the storage circuit 220 and used to determine whether at least two luminance values of the N luminance values meet a preset condition. The output circuit 240 is connected to the discrimination circuit 230 and the storage circuit 220, and used to output a preset default luminance value in response to the at least two luminance values meeting the preset condition and output at least one of the N luminance values in response to the at least two luminance values not meeting the preset condition.

The detection circuit of the present disclosure may detect a sudden change of the luminance of the ambient light, and return a luminance value that is more in line with the actual ambient luminance change to a processor (AP) according to the sudden change, so as to mitigate the poor user experience caused by a long response time of the photosensitive sensor.

Figure 3:
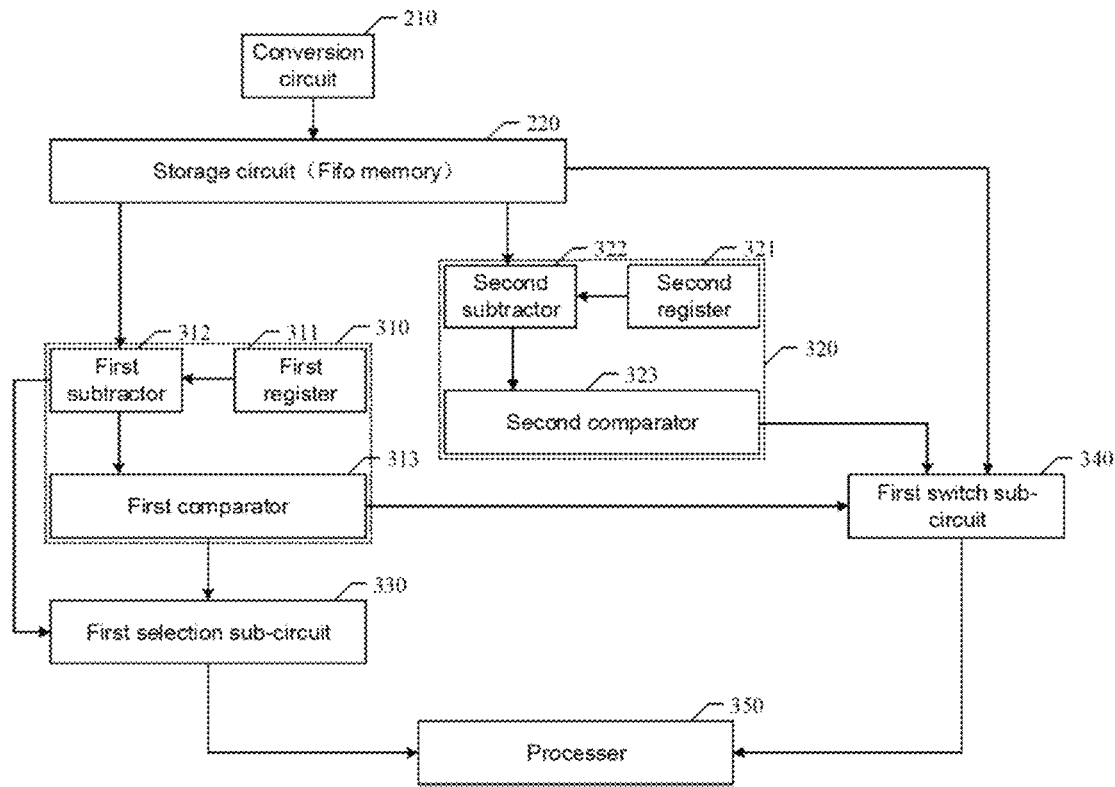
FIG. 3 schematically shows a schematic structural diagram of a detection circuit according to an exemplary embodiment of the present disclosure.

FIG. 3 schematically shows a schematic structural diagram of a detection circuit according to an exemplary embodiment of the present disclosure.

In the embodiments of the present disclosure, as shown in FIG. 3, the discrimination circuit 230 includes a first discrimination sub-circuit 310 connected to the storage circuit 220. The first discrimination sub-circuit 310 is used to determine whether at least one luminance value of the N luminance values is less than a preset reference luminance value. The discrimination circuit 230 further includes a second discrimination sub-circuit 320 connected to the storage circuit 220. The second discrimination sub-circuit 320 is used to determine whether a difference between at least two luminance values of the N luminance values exceeds a preset reference luminance difference.

The storage circuit 220 may store four or more luminance data, for example, 4 luminance data, 10 luminance data, 20 luminance data, etc. The specific number of luminance data may be adjusted according to actual requirements.

The first discrimination sub-circuit 310 may acquire one or more luminance values stored in the storage circuit 220, and determine whether the acquired luminance value is less than a preset reference luminance value. For example, the preset reference luminance value may be 100 Lux, or may be other preset values.

The second discrimination sub-circuit 320 may acquire at least two luminance values in the storage circuit 220, and determine a relationship between the preset reference luminance difference and a difference value between the plurality of acquired luminance values, for example, the difference value between the acquired luminance values is greater than the reference luminance difference, or the difference value between the acquired luminance values is less than or equal to the reference luminance difference, and so on. A step to be performed may be further determined according to the relationship between the preset reference luminance difference and the difference value between the acquired luminance values.

As shown in FIG. 3, the first discrimination sub-circuit includes a first register 311, a first subtractor 312 and a first comparator 313. The first register 311 is used to store the preset reference luminance value. The first subtractor 312 is connected to the storage circuit 220 and the first register 311, and used to subtract a first luminance value in the N luminance values from the preset reference luminance value stored in the first register 311, so as to obtain a first difference value. The first comparator 313 is connected to the first subtractor 312, and used to determine whether the first difference value output by the first subtractor 312 is greater than 0.

For example, the storage circuit 220 may store four luminance values, and the preset reference luminance value stored in the first register 311 may be 100 Lux, then the first subtractor 312 may subtract a first stored luminance value from the preset reference luminance value of 100 Lux, so as to obtain the first difference value. The first comparator 313 determines whether the first difference value is greater than 0.

The second discrimination sub-circuit 320 includes a second register 321, a second subtractor 322 and a second comparator 323. The second register 321 is used to store a reference luminance difference. The second subtractor 322 is connected to the storage circuit 220, and used to subtract an $(N-i)^{th}$ luminance value in the N luminance values from an $N^{th}$ luminance value in the N luminance values, so as to obtain a second difference value, where i is an integer, $1 \leq i < N$. The second comparator 323 is connected to the second register 321 and the second subtractor 322, and used to determine whether the second difference value output by the second subtractor 322 is less than the reference luminance difference stored in the second register 321.

For example, the storage circuit may store four luminance values, and the reference luminance difference stored in the second register 321 may be 3, then the second subtractor 322 may subtract a third luminance value from a fourth luminance value in the four luminance values, so as to obtain the second difference value. The second comparator 323 is used to determine whether the second difference value is less than 3.

The first selection sub-circuit 330 is connected to the first subtractor 312 and the first comparator 313, and used to select a default luminance value matching the first difference value output by the first subtractor 312 from a plurality of preset default luminance values and output the selected default luminance value in response to the first comparator 313 determining that the first difference value is greater than 0.

For example, a plurality of default luminance values may be preset, which correspond to different ranges. The first selection sub-circuit 330 selects and outputs the default luminance value according to the determination result from the first comparator 313.

The first switch sub-circuit 340 is connected to the first comparator 313, the second comparator 323 and the storage circuit 220. The first switch sub-circuit 340 may output the $N^{th}$ luminance value in the N luminance values in response to at least one of: the first comparator 313 determining that the first difference value is not greater than 0; or the second comparator 323 determining that the second difference value is less than the preset reference luminance difference.

For example, the fourth luminance value in the four luminance values may be output when the first comparator 313 determines that the first difference value is not greater than 0. Alternatively, the fourth luminance value in the four luminance values may also be output when the second comparator 323 determines that the second difference value is less than the preset reference luminance difference of 3.

Figure 4:
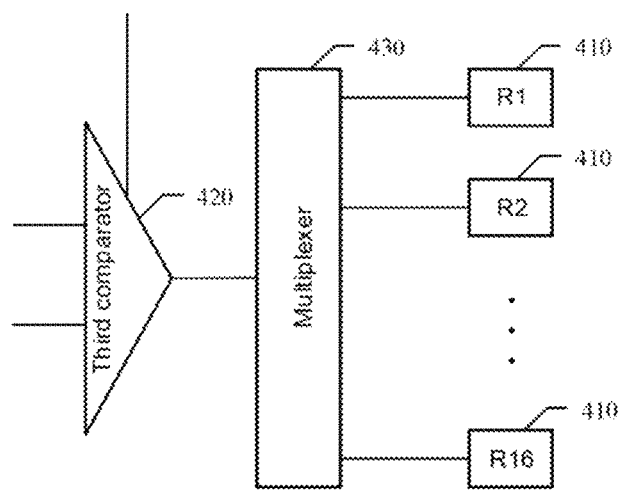
FIG. 4 schematically shows a schematic structural diagram of a first selection sub-circuit according to the exemplary embodiments of the present disclosure.

FIG. 4 schematically shows a schematic structural diagram of a first selection sub-circuit according to the exemplary embodiments of the present disclosure.

As shown in FIG. 4, the first selection sub-circuit 330 includes a plurality of shift registers 410, a third comparator 420 and a multiplexer 430. The plurality of shift registers 410 are respectively used to store a plurality of preset default luminance values. The third comparator 420 is connected to the first subtractor 312 and the first comparator 313. The third comparator 420 is used to determine, from a plurality of preset voltage ranges, a voltage range containing the first difference value, in response to the first comparator 313 determining that the first difference value is greater than 0. The multiplexer 430 is used to control one of the plurality of shift registers 410 to output the default luminance value stored by the one of the plurality of shift registers 410 according to the voltage range determined by the third comparator 420.

For example, when the first comparator 313 determines that the first difference value is greater than 0, since the preset voltage ranges include a plurality of small ranges, a luminance range of the first difference value is determined according to the result from the first subtractor 312.

In the embodiments of the present disclosure, each shift register 410 stores a specific value, that is, a corresponding luminance value. The third comparator 420 compares the result from the first subtractor 312 with the preset ranges, so as to determine the luminance range in which the first difference value is located.

FIG. 5 schematically shows a mapping table of a default luminance value corresponding to the first difference value according to the exemplary embodiments of the present disclosure.

In the embodiments of the present disclosure, for example, the preset reference luminance value stored in the first register 311 is 100 Lux, and the first luminance value stored in the storage circuit 220 is L, then the first difference value obtained by the first subtractor is $\Delta L=100-L$. A voltage range in the plurality of preset voltage ranges is determined according to $\Delta L$. As specifically shown in FIG. 5, each value of $\Delta L$ corresponds to a set luminance range. For example, when $\Delta L$ is 88 Lux, it is in a range of 80-89, that is, the third comparator determines that $\Delta L$ is in the range of 80-89, then the multiplexer 430 controls the corresponding shift register 410 to output the stored default luminance value, for example, output a luminance value of 10 Lux, according to this range.

Figure 6:
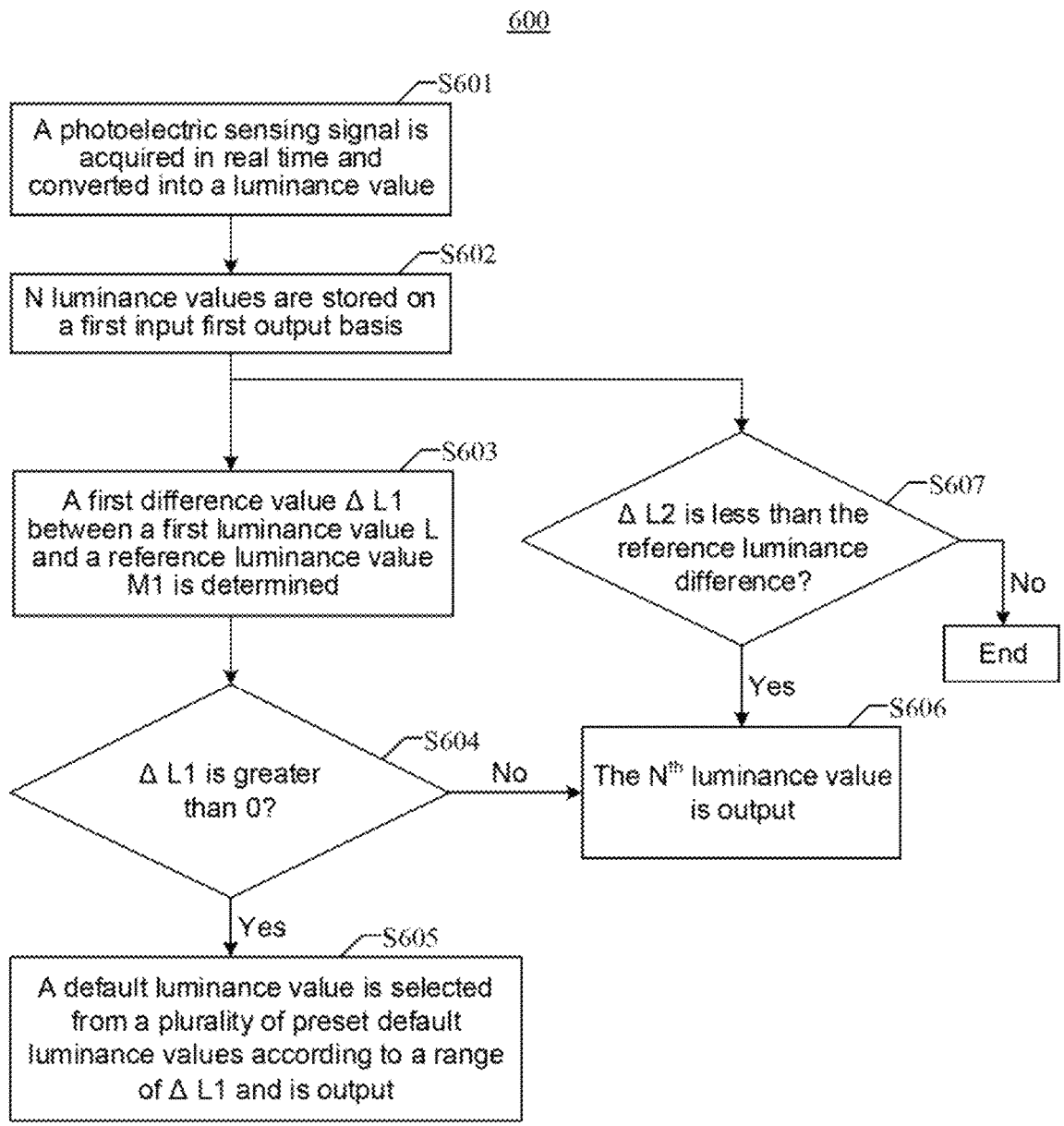
FIG. 6 schematically shows a flowchart of operations performed by a detection circuit according to an exemplary embodiment of the present disclosure.

FIG. 6 schematically shows a flowchart of operations performed by a detection circuit according to an exemplary embodiment of the present disclosure.

The execution flowchart of the detection circuit in the exemplary embodiment of the present disclosure is described in detail with reference to FIG. 3 and FIG. 6. Specifically, an execution flow 600 of the detection circuit shown in FIG. 3 includes operation S601 to operation S607.

In operation S601, a photoelectric sensing signal is acquired in real time and the acquired photoelectric sensing signal is converted into a luminance value.

In operation S602, N luminance values from the conversion circuit are stored on a first input first output basis. For example, the storage circuit may be implemented by using a First Input First Output (Fifo) memory, which has a memory space designed as 4*16 bit and may store four 16-bit luminance values, that is, corresponding to four frames of data. The luminance values are stored in the Fifo memory on a first input first output basis. In other optional embodiments, other numbers of luminance values are available, which may be set according to actual needs. The number of stored luminance values is not limited in the present disclosure.

In operation S603, a first difference value $\Delta L1$ between a first luminance value L in the stored N luminance values and a reference luminance value M1 is determined. The reference luminance value M1 is in a range of 90 Lux to 110 Lux. For example, the reference luminance value M1 may be 100 Lux, then the first difference value $\Delta L1=M1-L$, that is, $\Delta L1=100-L$.

In operation S604, it is determined whether the first difference value $\Delta L1$ is greater than 0. If $\Delta L1$ is greater than 0, operation S605 is performed, and if $\Delta L1$ is less than or equal to 0, operation S606 is performed.

In operation S605, a default luminance value is selected by the first selection sub-circuit from a plurality of preset default luminance values according to a range of the value of $\Delta L1$ and output.

In operation S606, the $N^{th}$ luminance value in the N luminance values is output by the first switch sub-circuit. For example, the fourth luminance value in the four luminance values stored in the storage circuit is output to the processor.

Operation S607 is performed in a period during which the operation S603 is performed. In operation S607, a second difference value $\Delta L2$ is calculated by subtracting the $(N-i)^{th}$ luminance value from the $N^{th}$ luminance value in the N luminance values stored in the storage circuit, and it is determined whether the second difference value $\Delta L2$ is less than the reference luminance difference. The reference luminance difference is in a range of 2 Lux to 4 Lux. For example, when the reference luminance difference is 3 Lux, it is determined whether the second difference value $\Delta L2$ between the fourth luminance value and the third luminance value in the four luminance values stored in the storage circuit is less than 3 Lux. If the second difference value is less than the reference luminance difference of 3, operation S606 is performed. If the second difference value is not less than the reference luminance difference, the process ends.

Figure 7:
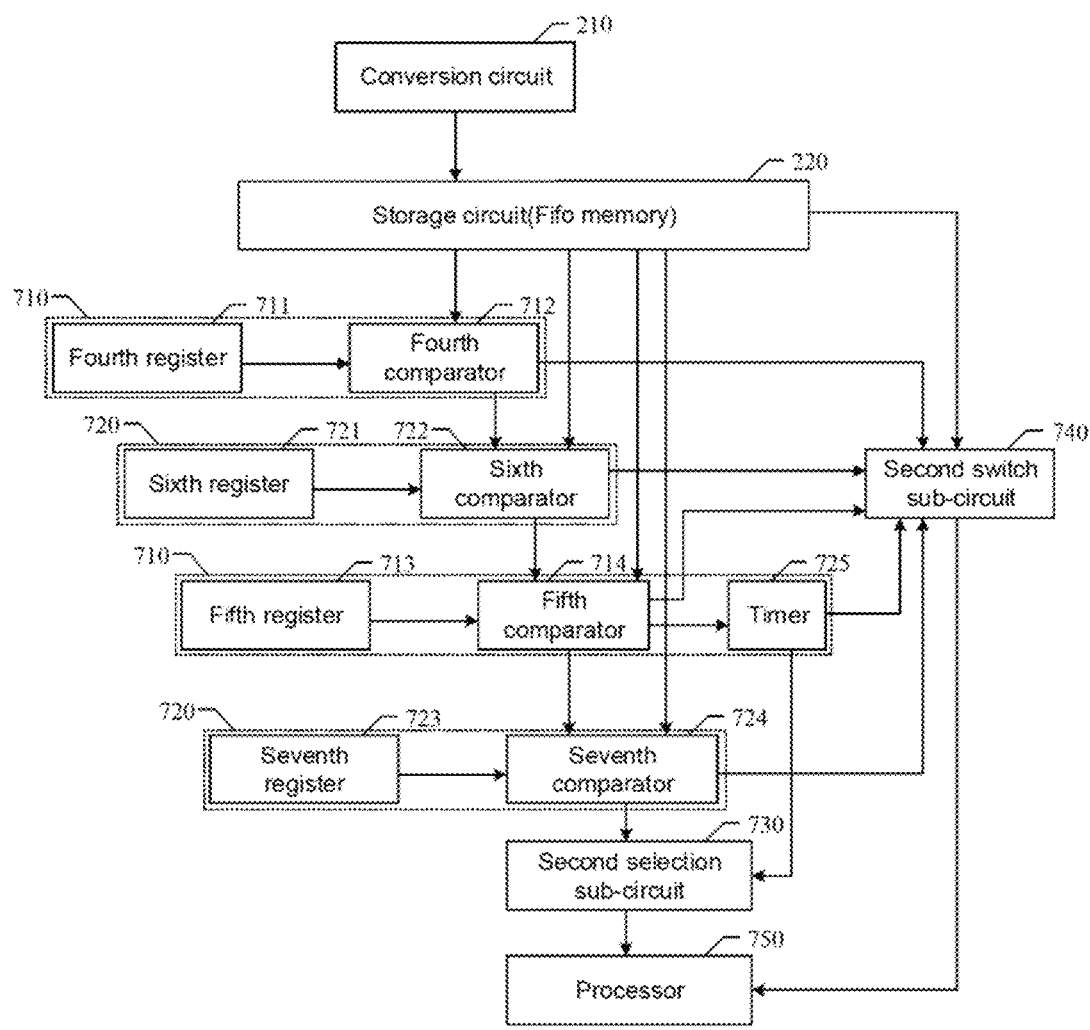
FIG. 7 schematically shows a schematic structural diagram of a detection circuit according to another exemplary embodiment of the present disclosure.

FIG. 7 schematically shows a schematic structural diagram of a detection circuit according to another exemplary embodiment of the present disclosure.

In this exemplary embodiment, the first discrimination sub-circuit 710 and the second discrimination sub-circuit 720 in the detection circuit are different from those in the aforementioned embodiments.

Specifically, as shown in FIG. 7, the first discrimination sub-circuit 710 includes a fourth register 711, a fourth comparator 712, a fifth register 713 and a fifth comparator 714. The fourth register 711 is used to store the first reference luminance value. The fourth comparator 712 is used to determine whether the $(1+j)^{th}$ luminance value in the N luminance values is less than the first reference luminance value, where j is an integer, $1 \leq j < N$. The fifth register 713 is used to store the second reference luminance value. The fifth comparator 714 is used to determine whether the $N^{th}$ luminance value in the N luminance values is less than the second reference luminance value.

In the embodiments of the present disclosure, the reference luminance value includes a first reference luminance value L1 and a second reference luminance value L3 less than the first reference luminance value. Specifically, the first reference luminance value is in a range of 90 Lux to 110 Lux, and the second reference luminance value is in a range of 20 Lux to 40 Lux.

For example, N is 20, and j is 2. The first reference luminance value L1 is set to 100 Lux, which is stored in the fourth register 711. The number of luminance values N stored in the storage circuit 220 is 20. The third luminance value is acquired from the storage circuit 220, and the fourth comparator 712 determines whether the third luminance value is less than the first reference luminance value of 100 Lux. The second reference luminance value L3 is set to 30 Lux, which is stored in the fifth register 713. The fifth comparator 714 may be used to determine whether the $20^{th}$ luminance value in the 20 luminance values is less than the second reference luminance value of 30 Lux.

The second discrimination sub-circuit includes a sixth register 721, a sixth comparator 722, a timer 725, a seventh register 723, and a seventh comparator 724. The sixth register 721 is used to store the first reference luminance difference. The sixth comparator 722 is connected to the fourth comparator 712, the fifth comparator 714 and the sixth register 721. The sixth comparator 722 is used to determine whether the difference value obtained by subtracting the $(1+j)^{th}$ luminance value from the first luminance value in the N luminance values is greater than the first reference luminance difference in response to the fourth comparator 712 determining that the $(1+j)^{th}$ luminance value is less than the first reference luminance value, and trigger the fifth comparator 714 to determine whether the $N^{th}$ luminance value in the N luminance values is less than the second reference luminance value in response to determining that the difference value obtained by subtracting the $(1+j)^{th}$ luminance value from the first luminance value is greater than the first reference luminance difference. The timer 725 is connected to the fifth comparator 714, and used to start timing in response to the fifth comparator determining that the $N^{th}$ luminance value in the N luminance values is less than the second reference luminance value. The timer 725 may include a counter for counting the number of luminance values (e.g., the number of luminance values input/or output from the Fifo memory) to determine whether a timeout occurs by using the counted number of luminance values. In some embodiments, the timer 725 may be a clock-based timer. The seventh register 723 is used to store the second reference luminance difference. The seventh comparator 724 is connected to the storage circuit 220, the seventh register 723 and the fifth comparator 714, and used to determine whether a difference value between the $N^{th}$ luminance value and the $(N-k)^{th}$ luminance value in the N luminance values is less than the second reference luminance difference in response to the fifth comparator 714 determining that the $N^{th}$ luminance value in the N luminance values is less than the second reference luminance difference, where k is an integer, $1 \leq k < N$.

In the embodiments of the present disclosure, the preset reference luminance difference includes a first reference luminance difference and a second reference luminance difference. A value of the first reference luminance difference is in a range of 150 Lux to 250 Lux, such as 150 Lux, 200 Lux or 250 Lux. A value of the second reference luminance difference is in a range of 1 Lux to 3 Lux, such as 1 Lux, 2 Lux or 3 Lux.

For example, N is 20, j is 2, and k is 2. The first reference luminance difference may be set to 200 Lux, which is stored in the sixth register 721, and the second reference luminance difference is set to 2 Lux, which is stored in in the seventh register 723. The sixth comparator 722 is used to determine whether a difference value obtained by subtracting the third luminance value from the first luminance value in the 20 luminance values is greater than the first reference luminance value of 200 Lux in response to the fourth comparator 714 determining that the third luminance value is less than the first reference luminance value of 100 Lux. If the difference value is greater than the first reference luminance difference of 200 Lux, the fifth comparator 714 determines whether the $20^{th}$ luminance value in the 20 luminance values is less than the second reference luminance value of 30 Lux. The timer 725 starts timing after obtaining the determination result from the fifth comparator 714. For example, the timer starts timing if the $20^{th}$ luminance value in the 20 luminance values is less than the second reference luminance value of 30 Lux. The seventh comparator 724 is used to determine whether a difference value between the $20^{th}$ luminance value and the $18^{th}$ luminance value in the 20 luminance values is less than the second reference luminance difference of 2 Lux.

In the embodiments of the present disclosure, as shown in FIG. 7, the output circuit includes a second selection sub-circuit 730 and a second switch sub-circuit 740. The second selection sub-circuit 730 is connected to the seventh comparator 724 and the timer 725. The second selection sub-circuit 730 may output a preset default luminance value in response to the seventh comparator 724 determining that the difference value between the $N^{th}$ luminance value and the $(N-k)^{th}$ luminance value is less than the second reference luminance difference and in response to the timer being not expired (for example, the time counted by the timer does not exceed a time duration corresponding to 300 luminance values). The second switch sub-circuit 740 is connected to the fourth comparator 712, the fifth comparator 714, the sixth comparator 722, the seventh comparator 724 and the storage circuit 220. The second switch sub-circuit 740 may output the $N^{th}$ luminance value in the N luminance values in response to at least one of: the fourth comparator 712 determining that the $(1+j)^{th}$ luminance value in the N luminance values is not less than the first reference luminance value; the fifth comparator 714 determining that the $N^{th}$ luminance value in the N luminance values is not less than the second reference luminance value; the sixth comparator 722 determining that the difference value obtained by subtracting the $(+j)^{th}$ luminance value from the first luminance value in the N luminance values is not greater than the first reference luminance difference; the seventh comparator 724 determining that the difference value between the $N^{th}$ luminance value and the $(N-k)^{th}$ luminance value in the N luminance values is not less than the second reference luminance difference; or the timer being expired.

For example, the second selection sub-circuit 730 may output a preset default luminance value when the seventh comparator 724 determines that the difference value between the $20^{th}$ luminance value and the $18^{th}$ luminance value is less than the second reference luminance difference of 2 Lux and when a counting result of the timer does not exceed 300 luminance values. The default luminance value may be, for example, 0 Lux, or other values, or other feasible methods of determining the default value are available.

For example, the second switch sub-circuit 740 may output the $20^{th}$ luminance value in the 20 luminance values in response to: the fourth comparator 712 determining that the third luminance value in the 20 luminance values is not less than the first reference luminance value of 100 Lux; the fifth comparator 714 determining that the $20^{th}$ luminance value in the 20 luminance values is not less than the second reference luminance value of 30 Lux; the sixth comparator 722 determining that the difference value obtained by subtracting the third luminance value from the first luminance value in the 20 luminance values is not greater than the first reference luminance difference of 200 Lux; the seventh comparator 724 determining that the difference value between the $20^{th}$ luminance value and the $18^{th}$ luminance value in the 20 luminance values is not less than the second reference luminance difference of 2 Lux; or the timer being expired, for example, a time duration counted by the timer exceeding the time duration required to store 300 frames of luminance values.

Figure 8:
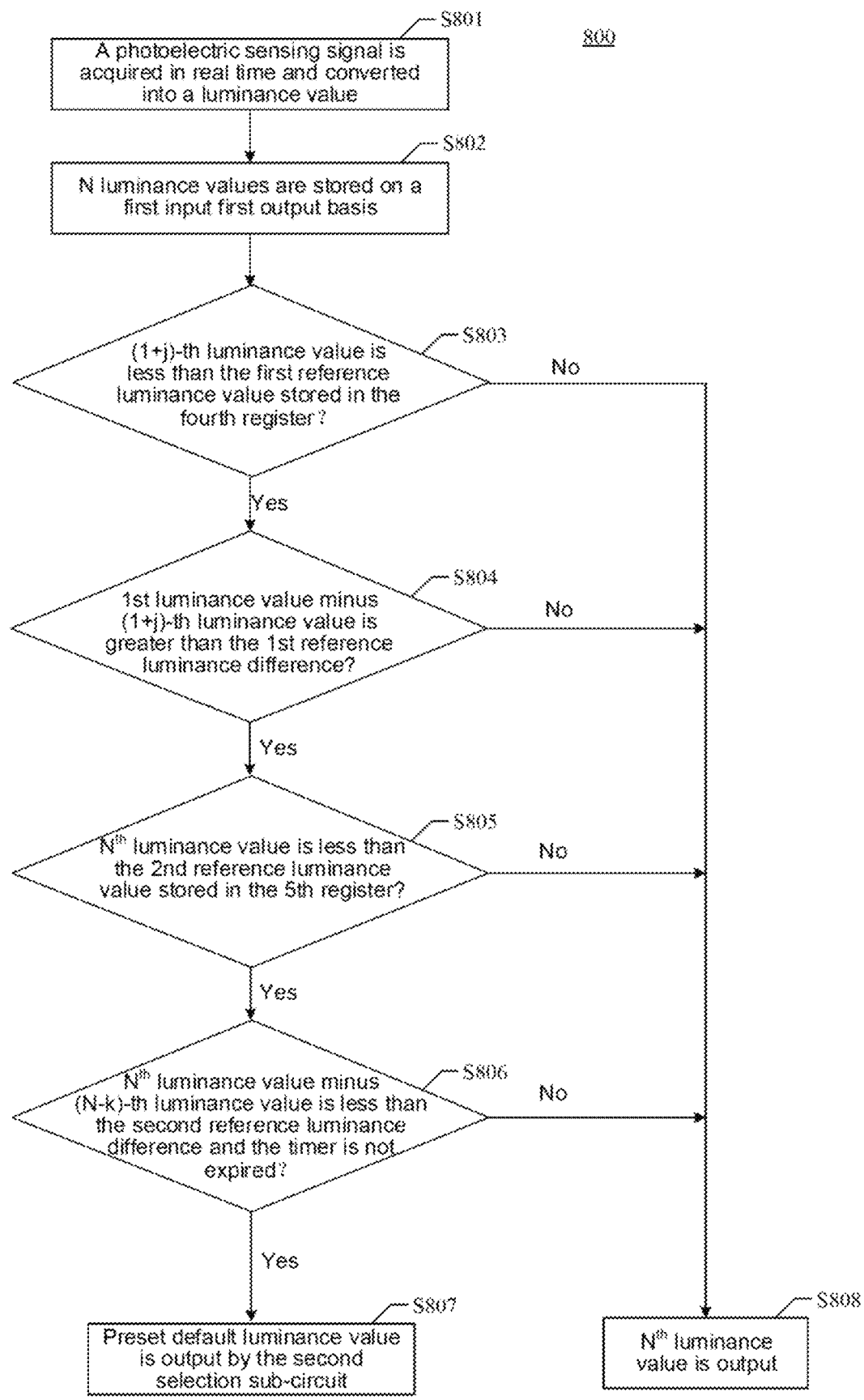
FIG. 8 schematically shows a flowchart of operations performed by a detection circuit according to another exemplary embodiment of the present disclosure.

FIG. 8 schematically shows an execution flowchart of a detection circuit according to another exemplary embodiment of the present disclosure.

The execution flowchart of the detection circuit in the exemplary embodiment of the present disclosure is described in detail with reference to FIG. 7 and FIG. 8. Specifically, an execution flow 800 of the detection circuit shown in FIG. 7 includes operation S801 to operation S808.

In operation S801, a photoelectric sensing signal is acquired in real time and the acquired photoelectric sensing signal is converted into a luminance value.

In operation S802, N luminance values from the conversion circuit are stored on a first input first output basis. For example, the storage circuit may be implemented by using a Fifo memory, which has a memory space designed as 20*16 bit and may store 20 luminance values, that is, corresponding to 20 frames of data.

In operation S803, it is determined whether the $(1+j)^{th}$ luminance value in the N luminance values is less than the first reference luminance value stored in the fourth register. For example, N is 20, j is 2, and the first reference luminance value is 100 Lux. It is determined whether the third luminance value in the 20 luminance values is less than the first reference luminance value of 100 Lux. If so, operation S804 is performed, and if not, operation S808 is performed.

In operation S804, it is determined whether the difference value obtained by subtracting the $(1+j)^{th}$ luminance value from the first luminance value in the N luminance values is greater than the first reference luminance difference. If the difference value obtained by subtracting the $(1+j)^{th}$ luminance value from the first luminance value in the N luminance values is greater than the first reference luminance difference, the fifth comparator is triggered to determine whether the $N^{th}$ luminance value in the N luminance values is less than the second reference luminance value. For example, if the first reference luminance difference is 200 Lux, it is determined whether the difference value obtained by subtracting the third luminance value from the first luminance value in the N luminance values is greater than 200 Lux. If so, the timer is triggered to start timing and operation S806 is performed, and if not, operation S808 is performed.

In operation S805, it is determined whether the $N^{th}$ luminance value in the N luminance values is less than the second reference luminance value stored in the fifth register. As described above, for example, if the second reference luminance value is 30 Lux, it is determined whether the $20^{th}$ luminance value in the 20 luminance values is less than 30 Lux. If so, operation S806 is performed, and if not, operation S808 is performed.

In operation S806, the timer starts timing, and it is determined whether the difference between the $N^{th}$ luminance value and the $(N-k)^{th}$ luminance value in the N luminance values is less than the second reference luminance difference and whether the timer has not timed out. If so, operation S807 is performed, otherwise, operation S808 is performed. For example, if N is 20, k is 2, and the value of the second reference luminance difference is 2 Lux, then it is determined whether the difference value between the $20^{th}$ luminance value and the $18^{th}$ luminance value in the 20 luminance values is less than 2 Lux. The set time threshold may be, for example, the time required for recording 300 luminance values. If the difference is less than the second reference luminance difference and the timer has not been expired.

In operation S807, a preset default luminance value is output. The default luminance value may be, for example, 0 Lux, or may be other set luminance values.

In operation S808, the $N^{th}$ luminance value in the N luminance values is output. For example, the $20^{th}$ luminance value in the 20 luminance values is output.

Figure 9:
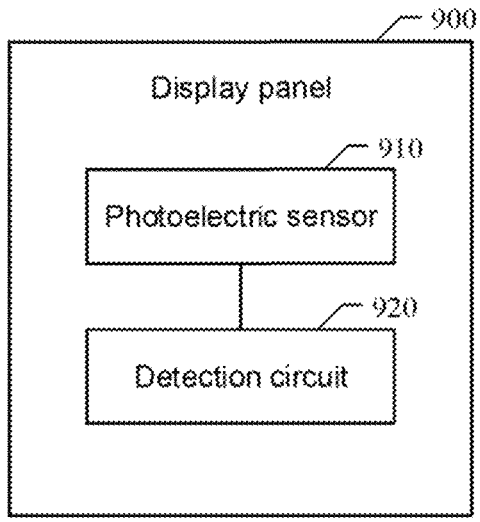
FIG. 9 schematically shows a schematic structural diagram of a detection panel according to the exemplary embodiments of the present disclosure.

FIG. 9 schematically shows a structural block diagram of a detection panel according to the exemplary embodiments of the present disclosure.

Another aspect of the present disclosure further provides a display panel 900, which may include a photoelectric sensor 910 and a detection circuit 920. The photoelectric sensor 910 is used to generate a photoelectric sensing signal by converting an optical signal into an electrical signal. The detection circuit 920 is the detection circuit described above, and the detection circuit 920 is connected to the photoelectric sensor 910.

Figure 10:
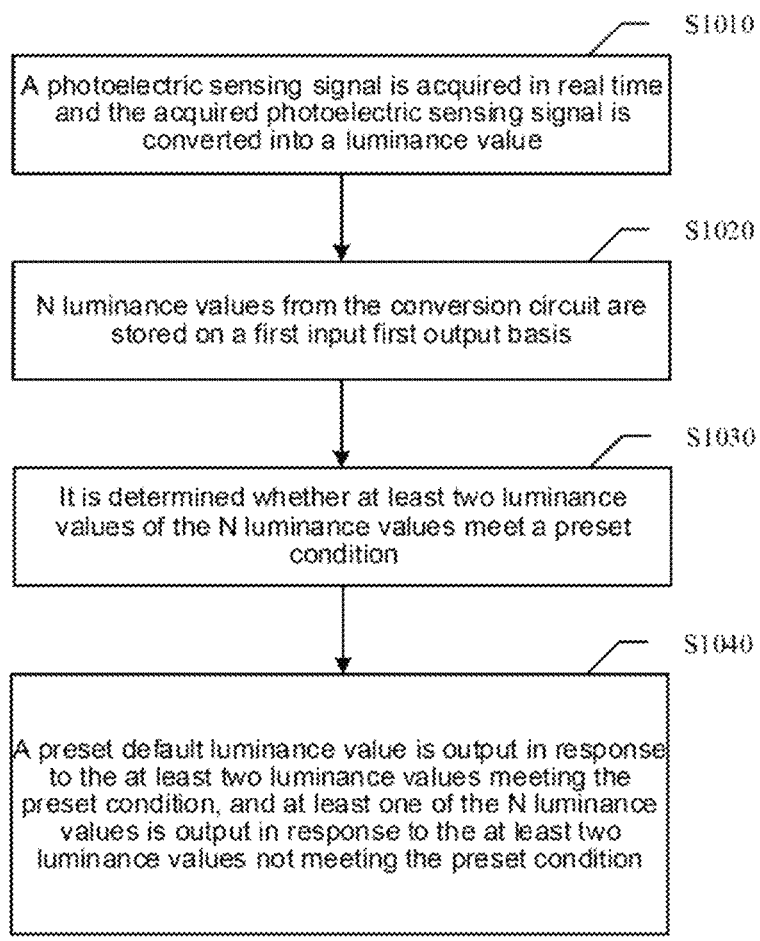
FIG. 10 schematically shows a flowchart of a detection method according to the exemplary embodiments of the present disclosure.

FIG. 10 schematically shows a flowchart of a detection method according to the exemplary embodiments of the present disclosure.

Another aspect of the present disclosure further provides a detection method. As shown in FIG. 9, the detection method includes operation S1010 to operation S1040.

In operation S1010, a photoelectric sensing signal is acquired in real time and the acquired photoelectric sensing signal is converted into a luminance value.

In operation S1020, N luminance values from the conversion circuit are stored on a first input first output basis.

In operation S1030, it is determined whether at least two luminance values of the N luminance values meet a preset condition.

Determining whether at least two luminance values of the N luminance values meet a preset condition includes: (1) determining whether at least one luminance value of the N luminance values is less than a preset reference luminance value; and (2) determining whether a difference value between at least two luminance values of the N luminance values exceeds a preset reference luminance difference.

In operation S1040, a preset default luminance value is output in response to the at least two luminance values meeting the preset condition, and at least one of the N luminance values is output in response to the at least two luminance values not meeting the preset condition.

According to the embodiments of the present disclosure, the detection circuit and the detection method of the present disclosure may effectively mitigate the problem of an excessively long response time of the photosensitive sensor due to the luminance change of ambient light which may cause a poor user experience.

Although some embodiments of the general technical concept of the present disclosure have been illustrated and described, it should be understood by those ordinary skilled in the art that these embodiments may be changed without departing from the principle and spirit of the general technical concept of the present disclosure. The scope of the present disclosure is defined by the claims and their equivalents.

What is claimed is:

1. A detection circuit, comprising:
   a conversion circuit configured to acquire a photoelectric sensing signal in real time and convert the acquired photoelectric sensing signal into a luminance value;
   a storage circuit connected to the conversion circuit and configured to store N luminance values from the conversion circuit on a first input first output basis;
   a discrimination circuit connected to the storage circuit and configured to determine whether at least two luminance values of the N luminance values meet a preset condition; and
   an output circuit connected to the discrimination circuit and the storage circuit, and configured to output a preset default luminance value in response to the at least two luminance values meeting the preset condition and output at least one of the N luminance values in response to the at least two luminance values not meeting the preset condition;

wherein the discrimination circuit comprises: a first discrimination sub-circuit connected to the storage circuit and configured to determine whether at least one luminance value of the N luminance values is less than a preset reference luminance value; and a second discrimination sub-circuit connected to the storage circuit and configured to determine whether a difference between the at least two luminance values of the N luminance values exceeds a preset reference luminance difference.

2. The detection circuit of claim 1, wherein the first discrimination sub-circuit comprises:
a first register configured to store the preset reference luminance value;
a first subtractor connected to the storage circuit and the first register, and configured to subtract a first luminance value in the N luminance values from the preset reference luminance value stored in the first register, so as to obtain a first difference value; and
a first comparator connected to the first subtractor and configured to determine whether the first difference value output by the first subtractor is greater than 0.

3. The detection circuit of claim 2, wherein the reference luminance value is in a range of 90 Lux to 110 Lux, and the reference luminance difference is in a range of 2 Lux to 4 Lux.

4. The detection circuit of claim 2, wherein the second discrimination sub-circuit comprises:
a second register configured to store the reference luminance difference;
a second subtractor connected to the storage circuit and configured to subtract an $(N-i)^{th}$ luminance value in the N luminance values from an $N^{th}$ luminance value in the N luminance values, so as to obtain a second difference value, where i is an integer, $1 \le i < N$; and
a second comparator connected to the second register and the second subtractor, and configured to determine whether the second difference value output by the second subtractor is less than the reference luminance difference stored in the second register.

5. The detection circuit of claim 4, wherein the output circuit comprises:
a first selection sub-circuit connected to the first subtractor and the first comparator, and configured to select, from a plurality of preset default luminance values, a default luminance value matching the first difference value output by the first subtractor and output the selected default luminance value, in response to the first comparator determining that the first difference value is greater than 0; and
a first switch sub-circuit connected to the first comparator, the second comparator and the storage circuit, and configured to output the $N^{th}$ luminance value in the N luminance values in response to at least one of:
the first comparator determining that the first difference value is not greater than 0; or
the second comparator determining that the second difference value is less than the preset reference luminance difference.

6. The detection circuit of claim 5, wherein the first selection sub-circuit comprises:
a plurality of shift registers configured to store a plurality of preset default luminance values respectively;
a third comparator connected to the first subtractor and the first comparator, and configured to determine, from a plurality of preset voltage ranges, a voltage range containing the first difference value, in response to the first comparator determining that the first difference value is greater than 0; and
a multiplexer configured to control one of the plurality of shift registers to output the default luminance value stored by the one of the plurality of shift registers according to the voltage range determined by the third comparator.

7. The detection circuit of claim 1, wherein the second discrimination sub-circuit comprises:
a second register configured to store the reference luminance difference;
a second subtractor connected to the storage circuit and configured to subtract an $(N-i)^{th}$ luminance value in the N luminance values from an $N^{th}$ luminance value in the N luminance values, so as to obtain a second difference value, where i is an integer, $1 \le i < N$; and
a second comparator connected to the second register and the second subtractor, and configured to determine whether the second difference value output by the second subtractor is less than the reference luminance difference stored in the second register.

8. The detection circuit of claim 7, wherein the output circuit comprises:
a first selection sub-circuit connected to the first subtractor and the first comparator, and configured to select, from a plurality of preset default luminance values, a default luminance value matching the first difference value output by the first subtractor and output the selected default luminance value, in response to the first comparator determining that the first difference value is greater than 0; and
a first switch sub-circuit connected to the first comparator, the second comparator and the storage circuit, and configured to output the $N^{th}$ luminance value in the N luminance values in response to at least one of:
the first comparator determining that the first difference value is not greater than 0; or
the second comparator determining that the second difference value is less than the preset reference luminance difference.

9. The detection circuit of claim 8, wherein the first selection sub-circuit comprises:
a plurality of shift registers configured to store a plurality of preset default luminance values respectively;
a third comparator connected to the first subtractor and the first comparator, and configured to determine, from a plurality of preset voltage ranges, a voltage range containing the first difference value, in response to the first comparator determining that the first difference value is greater than 0; and
a multiplexer configured to control one of the plurality of shift registers to output the default luminance value stored by the one of the plurality of shift registers according to the voltage range determined by the third comparator.

10. The detection circuit of claim 7, wherein $N=4$, $i=1$.

11. The detection circuit of claim 1, wherein the reference luminance value comprises a first reference luminance value and a second reference luminance value less than the first reference luminance value, and the first discrimination sub-circuit comprises:
a fourth register configured to store the first reference luminance value;

a fourth comparator configured to determine whether a $(1+j)^{th}$ luminance value in the N luminance values is less than the first reference luminance value, where j is an integer, $1 \leq j < N$;

a fifth register configured to store the second reference luminance value; and a fifth comparator configured to determine whether an $N^{th}$ luminance value in the N luminance values is less than the second reference luminance value.

12. The detection circuit of claim 11, wherein the preset reference luminance difference comprises a first reference luminance difference and a second reference luminance difference, and the second discrimination sub-circuit comprises:

a sixth register configured to store the first reference luminance difference;

a sixth comparator connected to the fourth comparator, the fifth comparator and the sixth register, and configured to determine whether a difference value obtained by subtracting the $(1+j)^{th}$ luminance value from the first luminance value in the N luminance values is greater than the first reference luminance difference in response to the fourth comparator determining that the $(1+j)^{th}$ luminance value is less than the first reference luminance value, and trigger the fifth comparator to determine whether the $N^{th}$ luminance value in the N luminance values is less than the second reference luminance value in response to determining that the difference value obtained by subtracting the $(1+j)^{th}$ luminance value from the first luminance value is greater than the first reference luminance difference;

a timer connected to the fifth comparator and configured to start timing in response to the fifth comparator determining that the $N^{th}$ luminance value in the N luminance values is less than the second reference luminance value;

a seventh register configured to store the second reference luminance difference; and a seventh comparator connected to the storage circuit, the seventh register and the fifth comparator, and configured to determine a difference value between the $N^{th}$ luminance value and an $(N-k)^{th}$ luminance value in the N luminance values is less than the second reference luminance difference in response to the fifth comparator determining that the $N^{th}$ luminance value in the N luminance values is less than the second reference luminance difference, where k is an integer, $1 \leq k < N$.

13. The detection circuit of claim 12, wherein the output circuit comprises:

a second selection sub-circuit connected to the seventh comparator and the timer, and configured to output a preset default luminance value in a case of the timer is not expired and the seventh comparator determines that the difference value between the $N^{th}$ luminance value and the $(N-k)^{th}$ luminance value is less than the second reference luminance difference; and a second switch sub-circuit connected to the fourth comparator, the fifth comparator, the sixth comparator, the seventh comparator and the storage circuit, and configured to output the $N^{th}$ luminance value in the N luminance values in response to at least one of:

the fourth comparator determining that the $(1+j)^{th}$ luminance value in the N luminance values is not less than the first reference luminance value;

the fifth comparator determining that the $N^{th}$ luminance value in the N luminance values is not less than the second reference luminance value;

the sixth comparator determining that the difference value obtained by subtracting the $(1+j)^{th}$ luminance value from the first luminance value in the N luminance values is not greater than the first reference luminance difference;

the seventh comparator determining that the difference value between the $N^{th}$ luminance value and the $(N-k)^{th}$ luminance value in the N luminance values is not less than the second reference luminance difference; or the timer being expired.

14. The detection circuit of claim 13, wherein N=20, j=2, k=2.

15. The detection circuit of claim 11, wherein, the first reference luminance value is in a range of 90 Lux to 110 Lux; and the second reference luminance value is in a range of 20 Lux to 40 Lux.

16. The detection circuit of claim 12, wherein, the first reference luminance difference is in a range of 150 Lux to 250 Lux; and the second reference luminance difference is in a range of 1 Lux to 3 Lux.

17. A display panel, comprising:

a photoelectric sensor configured to generate a photoelectric sensing signal by converting an optical signal into an electrical signal; and the detection circuit of claim 1, wherein the detection circuit is connected to the photoelectric sensor.

18. A method for detection, comprising:

acquiring a photoelectric sensing signal in real time and converting the acquired photoelectric sensing signal into a luminance value;

storing N luminance values from the conversion circuit on a first input first output basis;

determining whether at least two luminance values of the N luminance values meet a preset condition; and outputting a preset default luminance value in response to the at least two luminance values meeting the preset condition, and outputting at least one of the N luminance values in response to the at least two luminance values not meeting the preset condition;

wherein the determining whether at least two luminance values of the N luminance values meet a preset condition comprises: determining whether at least one luminance value of the N luminance values is less than a preset reference luminance value; and determining whether a difference value between the at least two luminance values of the N luminance values exceeds a preset reference luminance difference.

* * * * *